(12) United States Patent
Horne

(10) Patent No.: US 8,632,746 B1
(45) Date of Patent: Jan. 21, 2014

(54) PROCESS FOR THE MANUFACTURING OF FERRIC SULFATE FROM COLUMN OXIDATION OF FERROUS SULFATE

(71) Applicant: Ronald L. Horne, San Felipe, TX (US)

(72) Inventor: Ronald L. Horne, San Felipe, TX (US)

( * ) Notice: Subject to any disclaimer, the term of this patent is extended or adjusted under 35 U.S.C. 154(b) by 0 days.

(21) Appl. No.: 13/856,497

(22) Filed: Apr. 4, 2013

Related U.S. Application Data

(60) Provisional application No. 61/620,160, filed on Apr. 4, 2012.

(51) Int. Cl.
C01G 49/14 (2006.01)
(52) U.S. Cl.
USPC .......................................................... 423/558
(58) Field of Classification Search
USPC .......................................................... 423/558
See application file for complete search history.

(56) References Cited

U.S. PATENT DOCUMENTS

| | | | | |
|---|---|---|---|---|
| 4,814,158 A | * | 3/1989 | Everill | 423/558 |
| 5,129,936 A | * | 7/1992 | Wilson | 71/63 |
| 5,766,566 A | * | 6/1998 | Mattila et al. | 423/558 |
| 2004/0179992 A1 | * | 9/2004 | Faigen et al. | 423/558 |

* cited by examiner

Primary Examiner — Timothy Vanoy
(74) Attorney, Agent, or Firm — Egbert Law Offices, PLLC

(57) ABSTRACT

A process for producing ferric sulfate has the steps of reacting iron and water and sulfuric acid within a digester so as to produce a blend of ferric sulfate and ferrous sulfate, forming a column having an interior volume and an upper end in which the column has inert random packing material therein, passing the blend of the ferric sulfate and ferrous sulfate to the upper end of the column, introducing oxygen into the column at the upper end of the column, intimately mixing the oxygen with the blend of ferric sulfate and ferrous sulfate by gravity flowing the oxygen and the blend of ferric sulfate and ferrous sulfate downwardly through said random packing material in said column, and discharging the ferric sulfate from the interior volume of the column.

20 Claims, 1 Drawing Sheet

PROCESS FOR THE MANUFACTURING OF FERRIC SULFATE FROM COLUMN OXIDATION OF FERROUS SULFATE

RELATED U.S. APPLICATIONS

The present application claims priority from U.S. Provisional Patent Application Ser. No. 61/620,160, filed on Apr. 4, 2012 and entitled "Process for the Manufacturing of Ferric Sulfate from Column Oxidation of Ferrous Sulfate".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to apparatus and methods of manufacture of ferric sulfate. In particular, the present invention relates to processes for the production of ferric sulfate in the absence of pressure vessels. Additionally, the present invention relates to processes for the manufacture of ferric sulfate which use column oxidation of blends of ferrous sulfate and ferric sulfate.

2. Description of Related Art Including Information Disclosed Under 37 CFR 1.97 and 37 CFR 1.98.

Ferric sulfate [$Fe_2(SO_4)_3$] is a commonly-used material of commerce. It finds use in, for example, potable water and sewage treatment process, where it acts as a flocculant to remove suspended particles in the water. Furthermore, ferric sulfate is a useful precursor to other commonly-used materials of commerce. For example, roasting of ferric sulfate yields ferric oxide and sulfur trioxide gas, while hydration of sulfur trioxide gas yields sulfuric acid.

FIG. 1 shows a prior art process for the production of ferric sulfate. The process 10 of FIG. 1 is a two-staged process. Initially, the iron ore 12 is mixed with sulfuric acid 14 and water 16 in a digester container 18. In FIG. 1, it can be seen that the digester container 18 has separate inlets 12, 14 and 16 for the iron, the sulfuric acid and the water. This digester container 18 is heated to approximately 230° F. and exposed to atmospheric pressure. The product of the digestion process is a blend of ferrous sulfate and ferric sulfate which is passed from outlet 20 along line 22 to an oxidizer 24. The oxidizer 24 is a separate pressure vessel that allows oxygen 26 to be introduced through inlet 28 to the ferrous sulfate/ferric sulfate blend within the interior volume of the oxidizer 24. The pressure vessel 24 has an interior that is pressurized to approximately 60 p.s.i. As a result, ferric sulfate is passed through outlet 30 from the oxidizer.

Remaining liquids and gases from the oxidizer 24 can be passed through outlet 32 along line 34 to a pump 36. The pump 36 will pass these products through an eductor 38 so as to be reintroduced through an inlet 40 back into the oxidizer. Additional gas from the oxidizer 24 can be passed along line 42 to the eductor 38. As such, this gas and fluid can be reintroduced into the oxidizer so as to further process the ferric sulfate.

Unfortunately, the process of FIG. 1 is relatively expensive. Initially, both the digester container 18 and the oxidizer pressure vessel 24 are required for the process. The digester 18 is a relatively large vessel that can occupy a great deal of space within a production facility. The oxidizer is a relative expensive pressure vessel. Additionally, there can be hazards associated with operating the pressure vessel. Maintenance of the pressure vessel 24 is a constant requirement. Many times, seals can release the pressure so that repairs are necessary. As such, the prior art process of FIG. 1 that is employed for the production of ferric sulfate does not optimize the operating costs and capital expenditure associated with the production of such ferric sulfate.

In the past, various patents have issued relating to the production of ferric sulfate. For example, an early patent was U.S. Pat. No. 2,196,584, issued to A. E. Edison on Apr. 9, 1940. This patent describes a process for producing ferric sulfate in which ferrous sulfate is slurried in a sulfuric acid solution to make a slurry containing no substantial excess of water over that required to make the slurry fluid at all times. The ferrous sulfate in the slurry is oxidized with nitric acid. The oxidation occurs at a temperature above about 60° C.

U.S. Pat. No. 2,252,332, issued on Aug. 12, 1941 to J. K. Plummer, shows a process of making ferric sulfate in which iron sulfide ores are roasted in a furnace. The dust from the furnace gases that contain insoluble ferric oxide are collected and mixed with sulfuric acid. Water is added to the mixture. The mixture is stirred without the application of external heat until the reactor is raised to a temperature of approximately 310° F. The heat of reaction is held within the mixture by placing it in a heat-insulated chamber.

U.S. Pat. No. 2,306,425, issued on Dec. 29, 1942 to J. G. Bevan, provides a process for the production of ferric sulfate in which an aqueous solution of ferric sulfate is passed downwardly through a packed tower containing metallic iron so as to reduce the iron of the ferric sulfate and oxidize the metallic iron with the production of a solution of ferric sulfate in the upper portion of the tower. Gases containing sulfur dioxide and oxygen are passed upwardly through the tower in contact with the downwardly flowing solution so as to oxidize the ferrous sulfate and produce a solution of ferric sulfate in a lower portion of the tower.

U.S. Pat. No. 3,954,953, issued on May 4, 1976 to Satterwhite et al., describes an energy-conserving process for the manufacture of ferric sulfate. At an initial aqueous phase of the process, a low water-containing slurry or dispersion of iron oxide is reacted with only a portion of the total sulfuric acid required in the process to produce a ferric sulfate-containing slurry having unreacted iron oxide. A quantity of acid withheld from the aqueous phase is employed at the time of agglomeration of the ferric sulfate-containing slurry. The delay of the use of the remaining acid to a later step in the process allows the heat of reactor generated in the conversion of the unreacted iron oxide in the slurry to be utilized for completing the reaction and for drying the granules.

U.S. Pat. No. 4,036,941, issued on Jul. 19, 1977 to Boyles et al., shows the preparation of ferric sulfate solutions by a process for recovery of iron from an iron mud. The iron mud contains a mixture of gypsum and ferric hydroxide. The gypsum and the ferric hydroxide mixture is contacted with sulfuric acid of a concentration between 93 and 98 percent for a period of one to twelve hours. The undissolved material is removed and recovered as a 25 to 50 percent ferric sulfate solution.

U.S. Pat. No. 4,707,349, issued on Nov. 17, 1987 to N. B. Hjersted, provides a process of preparing a preferred ferric sulfate solution and product. Iron oxides or iron are dissolved in sulfuric acid to form ferrous sulfate. The ferrous sulfate is partially oxidized to ferric sulfate in the presence of dissolved oxygen. In a second stage of oxidation, the remaining ferrous sulfate is oxidized to ferric sulfate by the action of a non-molecular oxygen-oxidizing agent, such as hydrogen peroxide. During both stages of oxidation, a catalyst, such as copper sulfate or copper ammonium sulfate, is used.

U.S. Pat. No. 4,814,158, issued on Mar. 21, 1989 to N. R. Everill, describes a process for making liquid ferric sulfate from finely-divided ferric oxide, sulfuric acid and water. This is carried out in a closed reaction vessel at temperatures ranging from about 130° C. to about 150° C. and at pressures from about 30 p.s.i. to about 40 p.s.i. The reaction time ranges from four to eight hours.

U.S. Pat. No. 5,194,240, issued on Mar. 16, 1993 to J. R. Derka, provides the process of the manufacture of ferric sulphate from ferrous sulphate in a closed circuit or vessel having a liquid phase and a vapor phase. The vapor phase is a closed system. The process provides oxidation between about 70° C. to about 150° C. of the iron under pressure utilizing oxygen in the closed circuit and $NO_x$ as a catalyst. U.S. Pat. No. 5,332,565, issued on Jul. 26, 1994 to J. R. Derka., shows a similar process as that of U.S. Pat. No. 5,194,240.

U.S. Pat. No. 5,624,650, issued on Apr. 29, 1997 to McEwan et al., shows a nitric acid process for ferric sulfate production. Ferric sulfate is produced by treating ferric ammonium sulfate, ammonium jarosite, or a similar iron complex with nitric acid. The ferric ammonium sulfate or ammonium jarosite can be formed by treating a sulfuric acid. leaching solution with a solution of ammonium nitrate. Upon addition of dilute nitric acid at a temperature of about 60° C., ferric sulfate forms and is recovered.

U.S. Pat. No. 5,766,566, issued on Jun. 16, 1998 to Mattila et al., provides a process for preparing ferric sulfate by forming a slurry which contains ferrous sulfate and sulfuric acid. The slurry contains bivalent iron in both the solution phase and the solid phase. The slurry is oxidized to form a ferric sulfate slurry. The ferric sulfate slurry is solidified to form solid ferric sulfate.

U.S. Pat. No. 6,375,919, issued on Apr. 23, 2002 to Kakio et al., teaches a method for the manufacture of ferric sulfate solution and a water treatment agent using the same. Iron ore containing 30 percent of FeOOH as a trivalent iron is calcined at 200-600° C. and then dissolved in sulfuric acid.

U.S. Pat. No. 7,067,100, issued on Jun. 27, 2006 to Faigen et al., describes a liquid ferric sulfate manufacturing process. This liquid ferric sulfate is produced from finely-divided ferric oxide, sulfuric acid and water in a closed reaction vessel at temperatures ranging from about 130° C. to about 150° C. and pressures from about 30 p.s.i. to about 70 p.s.i. The reaction time ranges from four to eight hours and produces liquid. ferric sulfate having at least 10 percent trivalent iron. U.S. Pat. No. 7,387,770, issued on Jun. 17, 2008 to Wilkinson et al., shows a process similar to that of U.S. Pat. No. 7,067,100.

It is an object of the present invention to provide a method for the production of ferric sulfate.

It is another object of the present invention to provide a process for the production of ferric sulfate which eliminates the requirements of a pressure vessel.

It is a further object of the present invention to provide a process for the production of ferric sulfate which eliminates the space requirements and maintenance requirements of the pressure vessels.

It is still another object of the present invention to provide a process for the manufacture of ferric sulfate which minimizes the costs for the production of such ferric sulfate.

These and other objects and advantages of the present invention will become apparent from a reading of the attached specification and appended claims.

BRIEF SUMMARY OF THE INVENTION

The present invention is a process for producing ferric sulfate. The process of the present invention includes the steps of: (1) reacting iron, water and sulfuric acid within a digester so as to produce a blend. of ferric sulfate and ferrous sulfate; (2) passing the blend of ferric sulfate and ferrous sulfate to a column; (3) intimately mixing oxygen with the blend of ferric sulfine and ferrous sulfate within the interior volume of the column; and (4) discharging ferric sulfate from the column.

In this process of the present invention, the reaction of the iron, the water and the sulfuric acid is carried out at approximately 230° F. within the digester vessel. The ferric sulfate and ferrous sulfate is delivered to an upper end of the column. The column is filled with an inert packing material. In particular, this packing material is designed so as to maximize the surface area of contact between the oxygen and the ferric sulfate and ferrous sulfate blend. In particular, the packing material is formed of Raschig rings of ceramic material. The oxygen is introduced into the interior volume of the column adjacent to the top of the column thereof. As such, the reaction of the oxygen with the ferric sulfate and ferrous sulfate blend. will occur during the gravity flow of the liquid contents through the packing material of the column. As a result, the oxygen is intimately mixed with the blend of ferric sulfate and ferrous sulfate within the interior volume of the column.

A pump can be used so as to deliver the ferric sulfate and ferrous sulfate blend to the top of the column. Additionally, a suitable pump can be used so as to allow for the discharge of the non-ferric sulfate products from the column. These non-ferric sulfate products can then be delivered back to the digester so as to optimize the efficiency of the digester.

The column can be, in a preferred embodiment of the present invention, a twenty-four inch diameter pipe. This pipe can be lined with an inert elastomeric material, such as rubber.

Through this process of the present invention, the pressure vessel/oxidizer is eliminated. As such, the capital cost associated with the acquisition of such an oxidizer pressure vessel is avoided. Furthermore, the space and maintenance requirements for such a pressure vessel are also eliminated through the use of the column oxidizer of the present invention.

The foregoing Section is intended to describe, in generality, the preferred embodiment of the present invention. It is understood that modifications to this preferred embodiment can be made within the scope of the present invention. As such, this Section should not to be construed, in any way, as limiting of the scope of the present invention. The present invention should only be limited by the following claims and their legal equivalents.

DETAILED DESCRIPTION OF THE INVENTION

Figure 2:
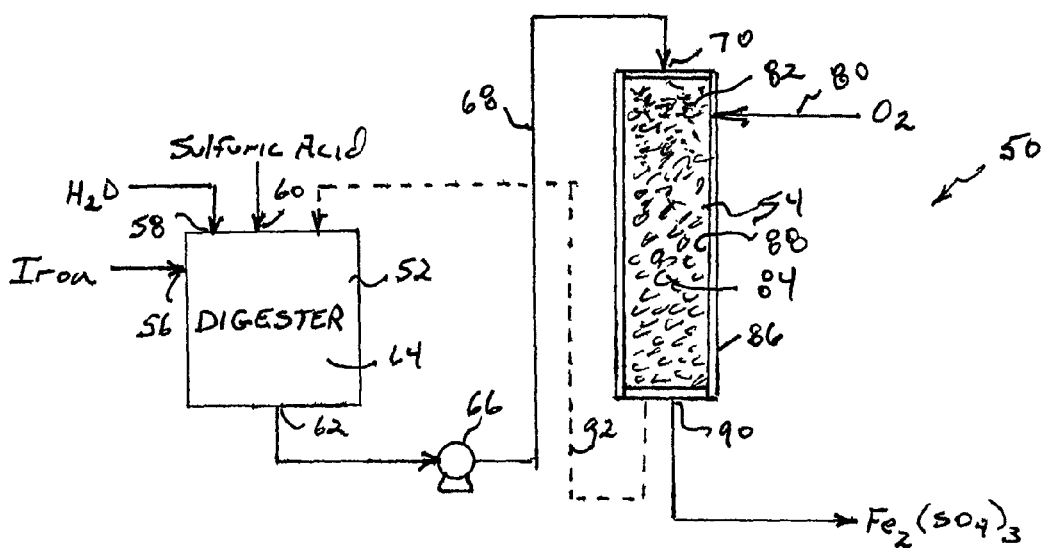
FIG. 2 is a diagrammatic illustration of the process for the present invention for the manufacturing of ferric sulfate.

Referring to FIG. 2, there is shown the process 50 for the production of ferric sulfate. The process 50 includes a digester vessel 52 and a column oxidizer 54. The digester vessel 52 has an first inlet 56, a second inlet 58 and a third inlet 60. An outlet 62 is located at the bottom of the digester vessel 52. The inlet 56 is suitable for allowing iron to be introduced into the interior volume 64 of the digester vessel 52. A conveyer can be used so as to deliver iron ore, solid reactant, or mill scale to the interior volume 64 of the digester vessel 52. The second inlet 58 is suitable for allowing water to be introduced into the interior volume 64 of the digester vessel 52. The third inlet 60 is suitable for allowing sulfuric acid to be introduced into the interior volume 64 of the digester vessel 52.

In the process of the present invention, the iron, the water and the sulfuric acid will mix within the digester. This mixture is subjected to a temperature of approximately 230°. Ultimately, a mixture of ferrous sulfate and ferric sulfate will be created by the reaction of the iron, the water and the sulfuric acid, along with the heat, within the interior volume 54 of the digester vessel 52. This ferric sulfate and ferrous sulfate blend will pass through outlet 62 to a pump 66. In the process of the present invention, the interior volume 64 of the digester vessel 52 is subjected to atmospheric pressure. The digester vessel 52 is not a pressure vessel. It is in the nature of a mixing tank.

The pump 64 delivers the ferric sulfate and ferrous sulfate blend along line 68 to the top of the column oxidizer 54. The column oxidizer 54 has an inlet 70 located at a top thereof. A suitable pipe 80 is connected to the interior volume 82 of the column oxidizer 54 so as to allow oxygen to be introduced into this interior volume.

In FIG. 2, it can be seen that the interior volume 82 of the column oxidizer 54 has a packing material 84 positioned therein. This packing material should. be an inert material that serves to maximize the surface area of contact between the ferric sulfate and ferrous sulfate blend passing downwardly through gravity and the oxygen that is introduced by pipe 80 into the interior volume 82. This packing material should be a ceramic material.

In the preferred embodiment of the present invention, the packing material 84 is in the nature of a Raschig ring. A Raschig ring is known in the art as a piece of tube that is approximately equal in length. and diameter. These Raschig rings are commonly used in large numbers as a packed bed within the columns for distillation and other chemical engineering processes. These Raschig rings are of a ceramic material and provide a large surface area within the interior volume of the column oxidizer 54 for interaction between liquids and gases. The Raschig rings form what is known as "random packing". As such, they are able to achieve a greater efficiency.

In FIG. 2, it can be seen that the exterior 86 of the column oxidizer 54 is of a steel material. A liner 88 covers the inner surface of the steel wall. The liner 88 should also be of an inert material, such as an elastomer and, more particularly, rubber. As such, the corrosive ferric sulfate and ferrous sulfate blend will not adversely affect the integrity of the steel material of the column oxidizer 54.

The column, oxidizer 54 has, in the preferred embodiment of the present invention, a diameter of approximately twenty-four inches. The column oxidizer 54 should have a suitable length so as to optimize the interaction between the oxygen and ferric sulfate and ferrous sulfate blend.

Ultimately, the column oxidizer 54 has an outlet 90 through which the ferric sulfate passes. As such. the ferric sulfate product of the process 50 of the present invention can be delivered for use.

In FIG. 2, there is shown a recycle line 92 in broken line fashion. Recycle line 92 can deliver the non-ferric sulfate products from the column oxidizer 54 for use back in the digester vessel 52. It can be seen that the line 92 will open at the digester vessel 52 so as to deliver these non-ferric sulfate products back to the digestion process within the digester vessel 52.

Figure 1:
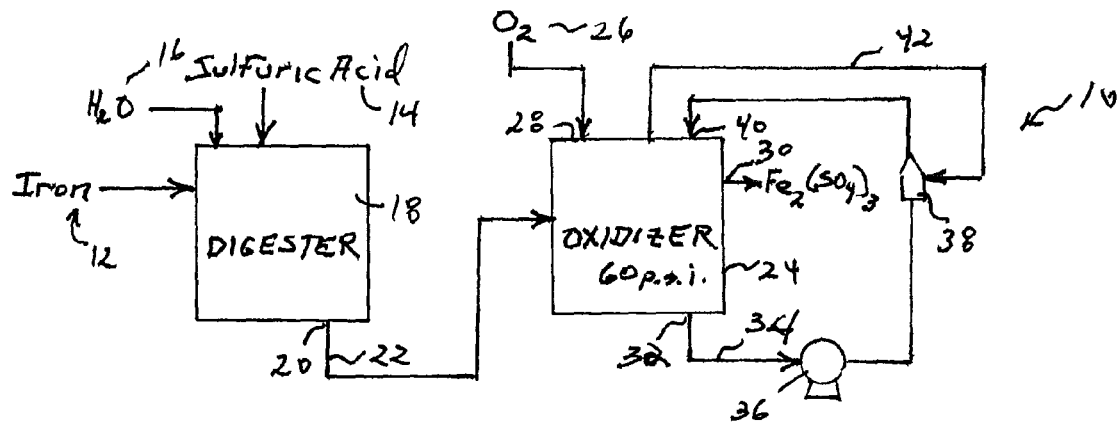
FIG. 1 is a diagrammatic illustration of a prior art system for the production of ferric sulfate.

Within the concept of the present invention, column oxidizer 54 would not be a pressure vessel. The reactions that occur within the column oxidizer 54 are carried out at atmospheric pressure. As such, the maintenance and repair associated with pressure vessels is effectively avoided. Additionally, the column oxidizer is relatively inexpensive when compared to the cost of pressure vessels, such as the oxidizer 24 of FIG. 1. The column oxidizer 54 will have a relatively minimal footprint within the production facility.

The foregoing disclosure and description of the invention is illustrative and explanatory thereof. Various changes in the details of the described method can be made within the scope of the present invention without departing from the true spirit of the invention. The present invention should only be limited by the following claims and their legal equivalents.

I claim:
1. A process of producing ferric sulfate comprising:
   reacting iron and water and sulfuric acid within a digester so as to produce a blend of ferric sulfate and ferrous sulfate;
   passing the blend of ferric sulfate and ferrous sulfate to a column;
   intimately mixing oxygen with the blend of ferric sulfate and ferrous sulfate within an interior volume of said column; and
   discharging the ferric sulfate from said interior volume of said column.
2. The process of claim 1, the step of reacting being at a temperature of approximately 230° F. within said digester.
3. The process of claim 1, further comprising:
   filling said column with an inert packing material prior to the step of passing.
4. The process of claim 3, said inert packing material being Raschig rings of ceramic material.
5. The process of claim 1, the step of passing the blend of ferric sulfate and ferrous sulfate comprising:
   delivering the blend of ferric sulfate and ferrous sulfate to an upper end of said column.
6. The process of claim 5, the step of intimately mixing oxygen comprising:
   introducing the oxygen into said interior volume of said column adjacent to a top of said column; and
   gravity flowing the oxygen and the blend of ferric sulfate and ferrous sulfate downwardly through said column.
7. The process of claim 6, said column being filled with a random packing material, the step of gravity flowing comprising:
   flowing the oxygen and the blend of ferric sulfate and ferrous sulfate along and through said random packing material in said interior volume of said column.
8. The process of claim 1, the step of passing the blend comprising:
   pumping the blend from said digester to an upper end of said column.
9. The process of claim 1, further comprising:
   removing non-ferric sulfate products from said column.
10. The process of claim 9, further comprising:
    pumping the non-ferric sulfate products back to said digester.
11. The process of claim 1, further comprising:
    lining said column with an inert elastomeric material prior to the step of passing the blend of ferric sulfate and ferrous sulfate to said column.

12. The process of claim 1, the step of reacting in said digester being at approximately atmospheric pressure.

13. A process of producing ferric sulfate comprising:
   reacting iron and water and sulfuric acid within a digester so as to produce a blend of ferric sulfate and ferrous sulfate;
   forming a column having an interior volume and an upper end, said column having inert random packing material therein;
   passing the blend of ferric sulfate and ferrous sulfate to said upper end of said column;
   introducing oxygen into said column at said upper end of said column;
   intimately mixing the oxygen with the blend of ferric sulfate and ferrous sulfate by gravity flowing the oxygen and the blend of ferric sulfate and ferrous sulfate downwardly through said random material packing in said column; and
   discharging the ferric sulfate from said interior volume of said column.

14. The process of claim 13, the step of reacting being at a temperature of approximately 230° F. within said digester.

15. The process of claim 13, said inert packing material being Raschig rings of ceramic material.

16. The process of claim 13, the step of forming said column further comprising:
   lining an inner wall of said column with an inert elastomeric material.

17. The process of claim 13, the step of reacting in said digester being at approximately atmospheric pressure.

18. The process of claim 13, the step of passing the blend comprising:
   pumping the blend from said digester to an upper end of said column.

19. The process of claim 13, further comprising:
   removing non-ferric sulfate products from said column.

20. The process of claim 13, further comprising:
   pumping the non-ferric sulfate products back to said digester.

* * * * *